United States Patent [19]

Sasamoto et al.

[11] 4,090,117
[45] May 16, 1978

[54] MAGNETIC DISC APPARATUS

[75] Inventors: Asao Sasamoto; Hideaki Amano, both of Odawara, Japan

[73] Assignee: Hitachi, Ltd., Japan

[21] Appl. No.: 722,577

[22] Filed: Sep. 13, 1976

[30] Foreign Application Priority Data

Sep. 25, 1975 Japan .............................. 50-130216[U]

[51] Int. Cl.$^2$ ............................................. H02P 3/04
[52] U.S. Cl. .................................................. 318/365
[58] Field of Search ............... 318/363, 364, 365, 368, 318/372, 382

[56] References Cited

U.S. PATENT DOCUMENTS

| 2,183,724 | 12/1939 | Schroder | 318/365 |
| 2,503,438 | 4/1950 | Gruner | 318/364 |
| 2,989,675 | 6/1961 | Lowe | 318/364 X |

Primary Examiner—Robert K. Schaefer
Assistant Examiner—W. E. Duncanson, Jr.
Attorney, Agent, or Firm—Craig & Antonelli

[57] ABSTRACT

In a magnetic disc apparatus of contact-start-stop type, when stopping the rotation of a disc, a brake is placed into operation at the beginning of contact of a magnetic head with a disc at which the number of revolutions of the disc is decreased following turning off of a power source for motor drive. The actuation of an armature of the brake is delayed through the use of a current generated by an inertia rotation of a motor. Thus, wasteful actuation of the brake while the motor is rotating at a high speed is inhibited thereby extending the lifetime of the brake.

1 Claim, 6 Drawing Figures

MAGNETIC DISC APPARATUS

BACKGROUND OF THE INVENTION

This invention relates to a magnetic disc apparatus of contact-start-stop type.

Generally, in a magnetic disc apparatus, even after a motor power source is turned off, the disc is not stopped immediately but continues to rotate at a gradually decreasing speed because of the inertia of rotatory bodies such as the disc, spindle and motor. If the disc is rotated at a low speed in a magnetic disc apparatus of contact-start-stop type, a head abuts against the disc surface and continues to rub on it. Accordingly, various types of braking operations are employed to decrease the period through which the head rubs on the disc surface, for the purpose of extending the lifetime of the apparatus. Among them, there are:

(a) applying a magnetic field across an aluminum disc secured to the spindle to generate eddy currents in the aluminum disc for effecting braking operation;

(b) abutting an electromagnetically controlled armature disc against a brake disc for effecting braking operation; and (c) cutting off the motor drive power source and then applying a D.C. current to the motor winding for effecting braking operation.

When the above three measures are relied upon, problems still remain since power is externally supplied in many applications to a small capacity apparatus. The measures (a) and (b) set forth above wherein power is supplied for effecting the braking operation following cutting off of power source for motor drive require a sequential control for the power source and in additon, lose the power supply for effecting the braking operation in the event of an emergency such as power failure. Even in the measure (b), the brake is placed into operation concurrently with cutting off of power source for motor drive so that a brake shoe rubs on an armature while the disc is rotating at a normal high speed (usually about 3000 r.p.m.), resulting in wear of both the brake shoe and the armature.

SUMMARY OF THE INVENTION

An object of the invention is to provide a magnetic disc apparatus free from brake wear.

The invention is characterized in that a brake is placed into operation at the beginning of contact of a magnetic head with a disc at which the number of revolutions of the disc is decreased after a short time from cutting off of a power source for motor drive.

According to the invention, the application of a braking force is inhibited while the disc is rotating at a high speed but enabled at the beginning of contact of the magnetic head with the disc when the speed of the disc becomes lower, so that the brake is operated at a high efficiency and freed from wear.

DESCRIPTION OF PRIOR ARTS

Figure 1:
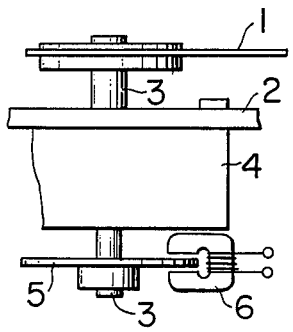
FIG. 1 is a partial side view of a combination of a disc drive motor and a brake in a magnetic disc apparatus to which the invention is applicable.
Figure 2:
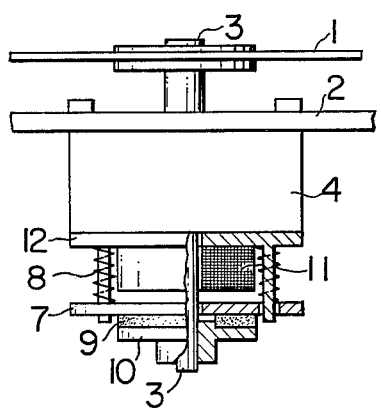
FIG. 2 is a partial side view, partly in section, of a combination of a disc drive motor and another brake of a magnetic disc apparatus to which the invention is applicable.

Referring now to FIGS. 1 and 2, there are shown prior art magnetic disc apparatus, specifically arrangement of their motors and brakes, each comprising a disc 1, a base 2, a spindle 3, and an induction motor 4. The example of FIG. 1 further comprises an aluminum disc 5 and a magnetic field device 6 whereas that of FIG. 2 further comprises an armature disc 7, a compression coil spring 8, a brake shoe 9, a brake disc 10, an electromagnetic coil 11 and a brake base 12.

In the apparatus shown in FIG. 1, the spindle 3 is mounted with the aluminum disc 5 across which a magnetic field is applied to generate eddy currents therein, thereby effecting braking operation. In the other apparatus shown in FIG. 2, the brake disc 10 having the brake shoe 9 bonded thereto is secured on the spindle 3 and the armature disc 7 is biased against the brake shoe 9 by means of the compression coil spring 8 seated on the brake base 12 secured to a motor frame, whereby the armature 7 may be pushed downward by the spring 8 to abut against the brake shoe 9 for effecting braking operation when a current flowing through the electromagnetic coil 11 is cut off so as to deenergize the electromagnetic coil 11 which has so far attracted the armature upward. Although not illustrated, the aforementioned third measure will be attentioned wherein the D.C. current is applied to the motor winding following cutting off of the motor drive power source for the purpose of effecting braking operation. Shortcomings of the three measures have already been outlined hereinbefore but it will be wise to describe in detail the mechanism of FIG. 2 for better understanding of the present invention.

Figure 3:
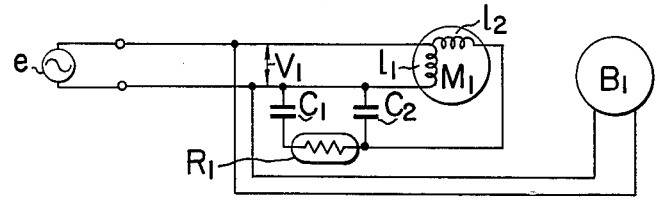
FIG. 3 is a circuit diagram of a prior art magnetic disc apparatus, showing connection between a motor and a brake.

The prior art motor and brake combination typically shown in FIG. 2 is electrically connected as shown in a prior art circuit diagram of FIG. 3. In FIG. 3, $M_1$ designates a motor representative of the induction motor 4 of FIG. 2, $l_1$ a main winding of the motor $M_1$, $l_2$ an auxiliary winding thereof, $C_1$ a starting capacitor, $C_2$ a steady rotation sustaining capacitor, $R_1$ a positive characteristic thermistor and $B_1$ a brake.

Figure 4:
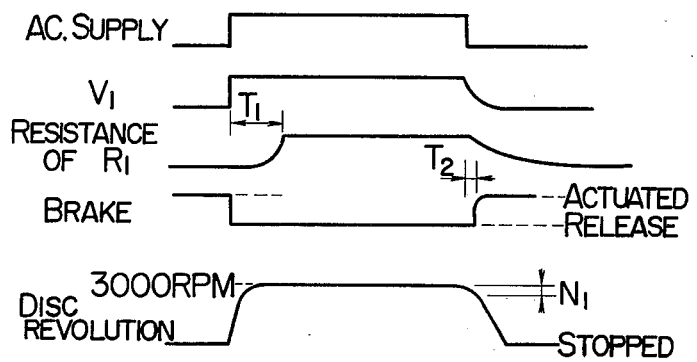
FIG. 4 is a time chart useful for explaining operation of the circuit shown in FIG. 3.

FIG. 4 is a time chart of the circuit of FIG. 3.

When an A.C. supply $e$ (for example A.C. 100 Volts) is applied to A.C. input terminal means, the electromagnetic coil (11 of FIG. 2) of the brake $B_1$ is excited to attract the armature 7, thereby releasing the brake. The motor $M_1$ (4 of FIG. 2) starts rotating rapidly by the aid of the capacitors $C_1$ and $C_2$ so that the period through which the magnetic head rubs on the disc surface may be decreased.

After time $T_1$ has elapsed, the positive characteristic thermistor $R_1$ raises its temperature by self-heat generation to change its resistance from several ohms to several kilo-ohms, disconnecting the starting capacitor $C_1$ from the auxiliary winding $l_2$. As a result, the motor $M_1$ continues to rotate through the steady rotation substaining capacitor $C_2$.

When the A.C. supply is cut off from the input terminal, the armature 7 is attracted continuously by a residual magnetic flux of the electromagnetic coil 11 of brake $B_1$ which prevents the brake from being actuated immediately and the number of revolution of the motor $M_1$ is reduced by $N_1$ (about 100 r.p.m.) on account of windage loss and friction. The positive characteristic thermistor $R_1$ now bearing a resistance of several kilo-ohms prevents the connection of the starting capacitor $C_1$ to the auxiliary winding $l_2$ and the steady rotation sustaining capacitor $C_2$ alone can not cause the motor $M_1$ to generate enough current to maintain the brake $B_1$ to attract the armature 7. Consequently, after time $T_2$ has elapsed, the brake is actuated so that the rotation of the disc 1 is rapidly reduced and stopped. In this manner, the brake is placed into operation while the motor is rotating at a rated high speed (3000 r.p.m.). However, in the magnetic disc apparatus of contact start-stop type, the magnetic head usually lands on or leaves from the disc surface at a motor speed within the range of from several hundred r.p.m. to 1000 r.p.m. For this reason, it is understood that the brake actuation at a motor speed within the range of from 3000 r.p.m. to 1000 r.p.m. is wasted only wearing out the brake shoe 9 and decreasing the lifetime thereof. Further, the positive characteristic thermistor $R_1$ requires a substantial time (about 1 to 2 minutes) for its heat dissipation and the motor is prevented from restarting before the heat dissipation has been completed. If restarted, the inoperative starting capacitor $C_1$ prevents the motor from rushing into rotation with the result that the magnetic head rubs on the disc surface for a long time.

DETAILED DESCRIPTION OF A PREFERRED EMBODIMENT

This invention contemplates an improvement of a prior art motor-brake circuit of the magnetic disc apparatus as shown in FIG. 2, for example, and the present apparatus is designed such that the brake is actuated when the number of revolutions of the disc is decreased sufficiently to begin the contact of the magnetic head with the disc after a short lapse of time from the cutting off of the power source for motor drive so that the application of a braking force may be inhibited while the disc is rotating at a high speed but enabled while the disc is rotating at a lower speed at which the magnetic head may be caused to begin the contact with the disc, thereby improving efficiency of the brake and reducing wear thereof.

Figure 5:
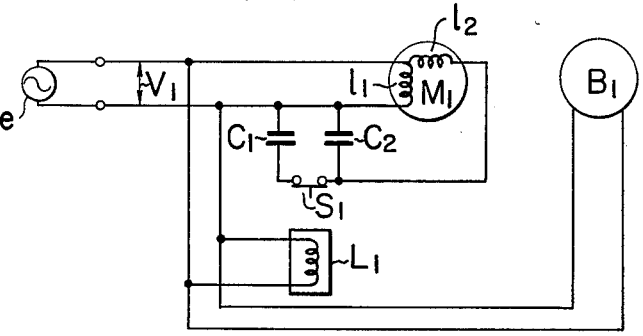
FIG. 5 is a circuit diagram of a magnetic disc apparatus embodying the invention, showing connection between a motor and a brake.
Figure 6:
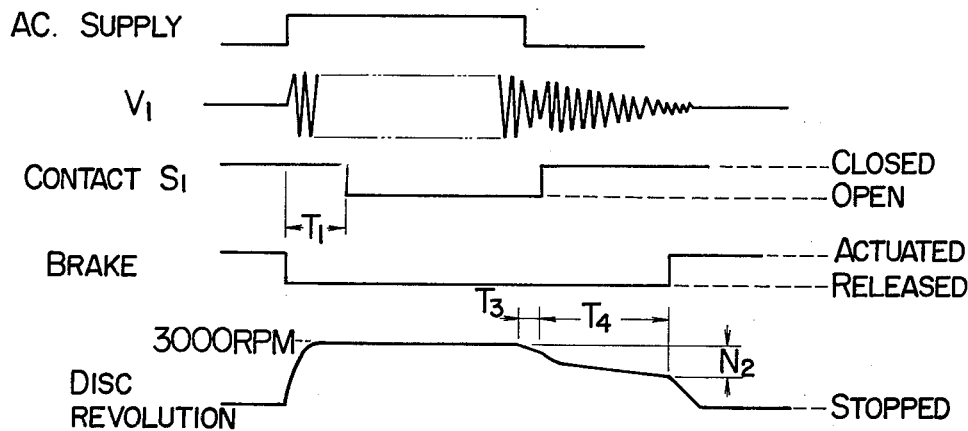
FIG. 6 is a time chart useful for explaining operation of the circuit shown in FIG. 5.

Referring now to FIGS. 5 and 6, there are shown a circuit diagram embodying the invention in such a fashion as the invention is applied to the motor-brake circuit of FIG. 2, and a time chart for the circuit of the embodiment.

Connected in parallel with a brake $B_1$ is a delay relay $L_1$ which is actuatable a predetermined time after the application of an input. A normally-closed contact $S_1$ of the delay relay $L_1$ is interposed between as auxiliary winding $l_2$ of a motor $M_1$ and a starting capacitor $C_1$. The remainder of the connections in FIG. 5 are the same as FIG. 3.

With an A.C. input applied, the coil (not shown) of the brake $B_1$ is excited, releasing the brake $B_1$. Both the capacitors $C_1$ and $C_2$ participate in a rapid rotation of the motor $M_1$. After time $T_1$ has elapsed, the delay relay $L_1$ becomes alive and it follows that the normally-closed contact $S_1$ is open, the starting capacitor becomes inoperative and the motor $M_1$ continues rotating only through the steady rotation sustaining capacitor $C_2$.

Even when the A.C. input has disappeared, a residual magnetic flux of the brake $B_1$ is effective to attract the armature 7, keeping the brake released. After time $T_3$ corresponding to a time lag of the delay relay $L_1$ has elapsed, the contact $S_1$ recovers its normal state so that the motor generates by its rotation due to inertia, a current which flows through the capacitors $C_1$ and $C_2$. The voltage $V_1$ appering across the lines is illustrated in detail in FIG. 6. The voltage generation in the motor can hardly be achieved only by the steady rotation sustaining capacitor $C_2$. By the aid of the starting capacitor $C_1$, however, a large voltage (about A.C. 60 volts) can be generated since the starting capacitor $C_1$ has a capacitance about five times as large as that of the steady rotation sustaining capacitor $C_2$ in order to start the motor with a steep rise. A current due to the voltage thus generated is passed through the brake $B_1$ to keep the armature 7 attracted. As a result, the time for placing the brake into operation is delayed to the termination of time $T_4$ at which the number of revolution of the motor is decreased to $N_2$ (about 1500 r.p.m.). In this manner, the braking operation is prevented while the motor is rotating at a high speed within the range of from 3000 r.p.m. to 1500 r.p.m. but it is effected immediately before the magnetic head lands on the disc surface. The operating point of the delay relay $L_1$ is preferably set above A.C. 80 volts to prevent the voltage generated by the inertia motor rotation from energizing the delay relay $L_1$.

We claim:
1. A magnetic disc apparatus comprising:
   a magnetic disc;
   terminal means for receiving an electric supply;
   an induction motor connected to said terminal means for rotating said disc, said motor being provided with a first capacitor which is operative at the start of said motor and a second capacitor which is operative constantly;
   an electromagnetic brake connected to said terminal means and adapted to be placed into operation for stopping rotation of said motor when deenergized; and
   a delay relay connected in parallel with said electromagnetic brake and having a normally-closed contact, said first capacitor being connected in parallel with said second capacitor through said normally-closed contact, whereby when said electric supply is cut off from said terminal means said normally-closed contact is closed and the starting time for placing said electromagnetic brake into operation is delayed by supplying said electromagnetic brake with a current generated by said motor due to an inertia rotation thereof upon the cutting-off of said electric supply from said terminal means.

* * * * *